INVENTOR.
Grady L. Payne
BY
Andrew L. Gabriault
ATTORNEY

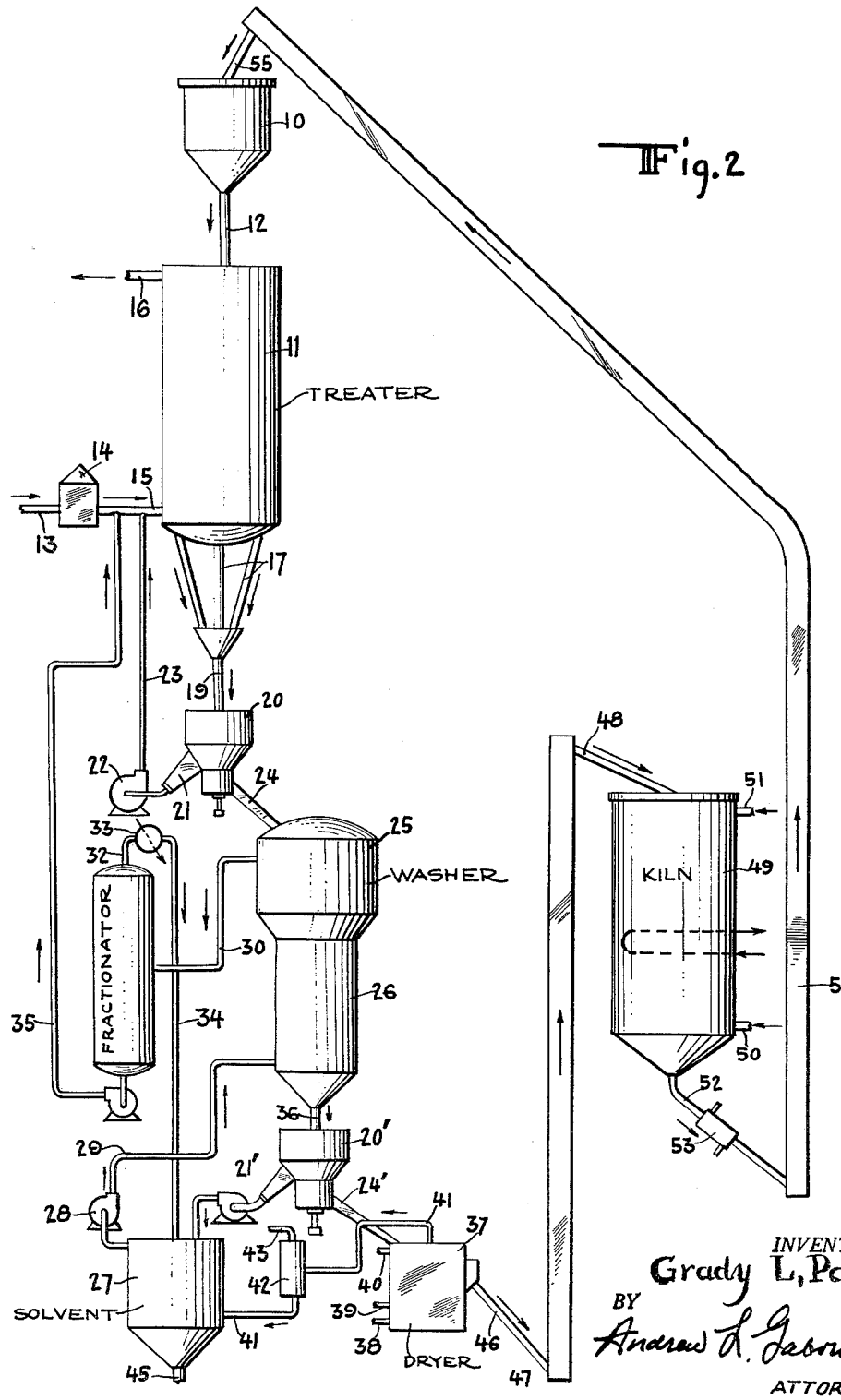

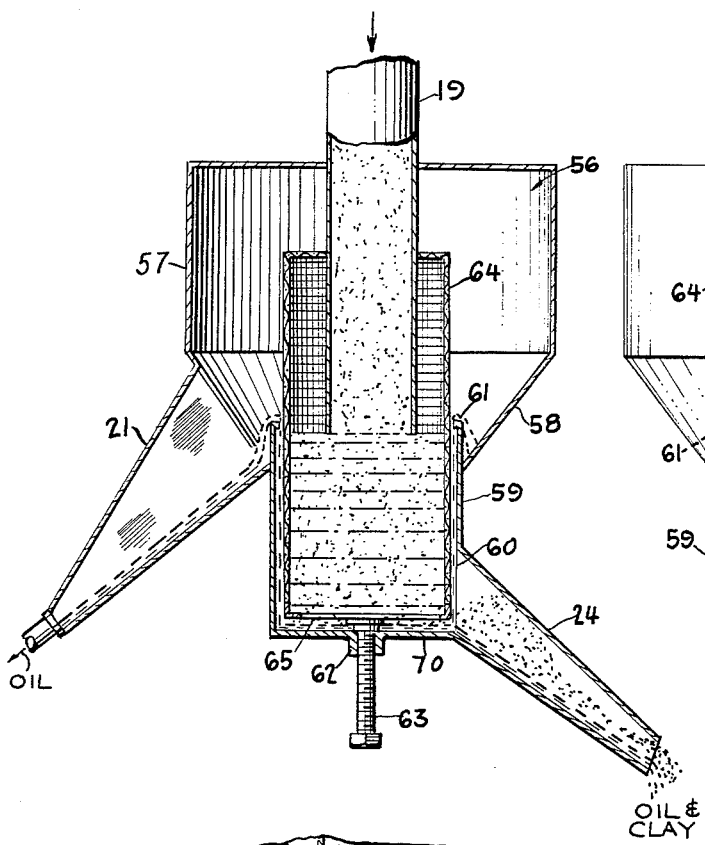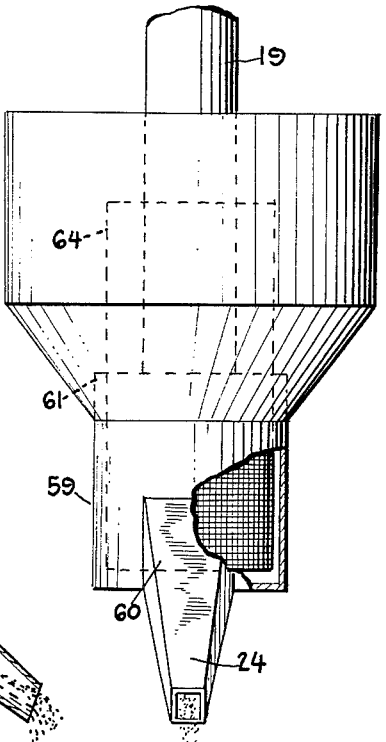

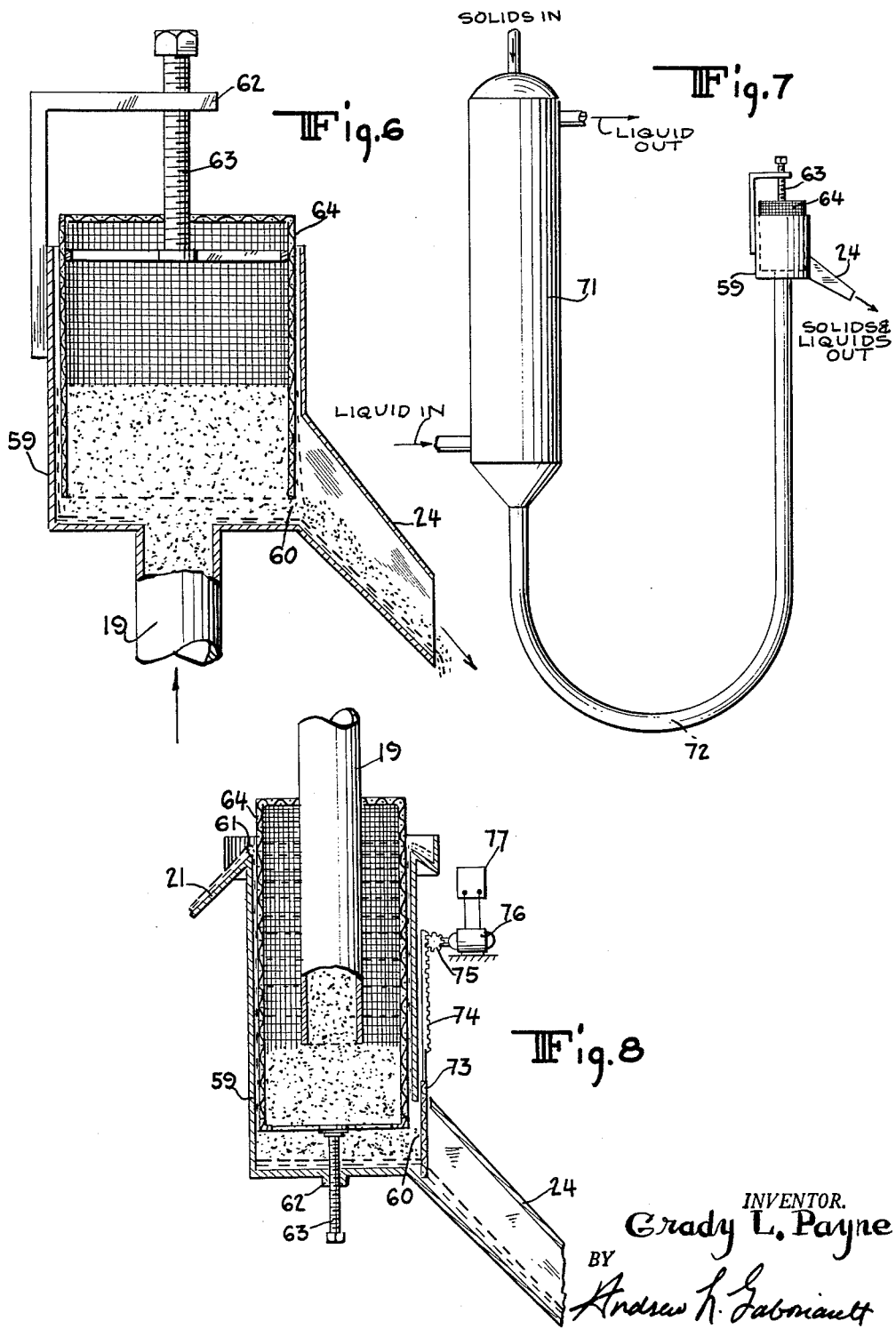

United States Patent Office 3,052,356
Patented Sept. 4, 1962

3,052,356
METHOD AND APPARATUS FOR THE CONTROLLED WITHDRAWAL OF GRANULAR SOLIDS FROM A LIQUID-GRANULAR SOLID CONTACTING ZONE
Grady L. Payne, Mickleton, N.J., assignor to Socony Mobil Oil Company, Inc., a corporation of New York
Filed Feb. 9, 1959, Ser. No. 792,188
7 Claims. (Cl. 210—74)

This application is a continuation-in-part of application Serial Number 637,730, filed February 1, 1957, now abandoned.

This invention relates to a method and apparatus for contacting liquids with granular solids. It is particularly related to a method and apparatus for controlling the flow rate of granular adsorbent solids from a contacting zone of a liquid-granular solids contacting process.

Typical of the processes to which this invention applies is the process for the continuous countercurrent contacting of liquid hydrocarbon oils, such as mineral oil, with a granular adsorbent, such as fuller's earth, for the purpose of decolorizing the oil and removing small amounts of impurities therefrom. Other typical processes include continuous treatment of water with granular zeolites, liquid phase conversion of hydrocarbons in the presence of granular materials and continuous treatment of sugar solutions to remove color bodies therefrom.

This invention will be best understood by referring to the attached drawings, of which:

FIGURE 2 is a highly diagrammatic flow sheet illustration of a continuous mineral oil percolation process to which this invention applies;

FIGURE 3 is an elevational view in cross-section of a flow control device designed according to the teaching of this invention;

FIGURE 4 is a fragmentary cross-sectional view in elevation of the device of FIGURE 3 in which the retarding screen is in the upward position;

FIGURE 5 is a side elevational view of the flow control device of FIGURE 3 showing a fragmentary section of the retarding screen, the exit port in the outside chamber and the trough for removing liquid and solids from the outside chamber;

FIGURE 6 is an elevational sectional view of an alternative form of this invention;

FIGURE 7 is an elevational view of a liquid-solids contacting zone employing the device shown in detail in FIGURE 6, and FIGURE 8 is an elevational sectional view of a second alternative within the broad scope of this invention.

All of these drawings are diagrammatic in form and like parts in all bear like numerals.

Figure 1:
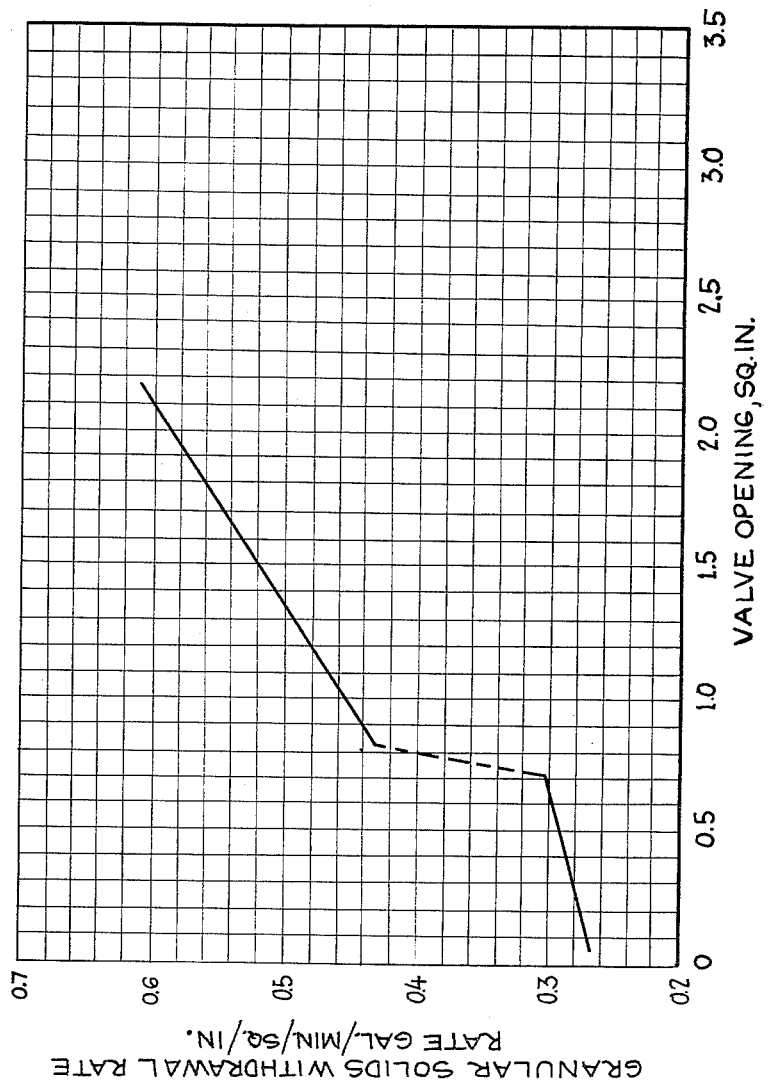
FIGURE 1 is a graph showing the variation of granular solids withdrawal rate with the area of control valve opening in a mineral oil contacting system.

In continuous processes for liquid-solids contacting it is, of course, necessary to control the rate of solids withdrawal from the contacting zone in order to control the degree and uniformity of contacting between liquids and solids. As a specific example in the Thermofor Continuous Percolation process a granular adsorbent is moved through the contacting zone as a columnar mass. Liquid, for example mineral oil, is passed upwardly through the mass to be contacted in the manner desired, for example to decolorize the oil. Clearly the extent to which this liquid is contacted, that is, the contact time and the liquid to solids contacting ratio, depends in part upon the rate of downward movement of the adsorbent mass which in turn depends upon the rate at which solids are removed from the lower end of the mass. The uniformity of contacting depends on the rate of solids movement remaining substantially constant while the liquid is being treated.

The control of the solids rate which these factors require must be achieved in the presence of liquid since some of the liquid from the contacting zone will always accompany the solids as they leave the zone.

Control of solids rate when the solids exist in a mixture with liquid has proven to be something of a problem in many systems because conventional variable opening flow control devices, such as valves, do not provide satisfactory control.

The graph of FIGURE 1 illustrates one of the reasons for this. There, the solids flow rate, in a system in which the solids are mixed with liquid hydrocarbons, is plotted against valve opening. It will be noted that while control is effected at low flow rates (lower solid line) and at high flow rates (upper solid line), there is a wide range of flow rates in between (dashed line) over which there is no reliable control because the flow rate fluctuates widely at a single valve setting and may alter radically with a very slight change in valve opening.

It is believed that in the controllable lower range of flow rates (hereinafter defined and called the "viscous" or "plastic" flow condition), substantially all of the solids particles are touching each other while in the controllable higher range of flow rates (hereinafter defined and called the "turbulent" flow condition) substantially all of the solids particles are separated by liquid. The uncontrollable condition (hereinafter defined and called the "transient" condition) between the two occurs when the conversion from one to the other stable condition occurs. This change in flow condition results then from a change in liquid-solids composition of the slurry stream acted on. This change is possible because of the large reservoir of liquid and solids which exists in the contacting zone that makes it possible for the liquid and solids rates to vary independently of each other.

The uncontrollable range demonstrated in FIGURE 1 has been found to occur when liquids other than hydrocarbons are being contacted; for example, it occurs with aqueous sugar solutions.

The problem is further complicated by the fact that, even with the same apparatus, liquid and solids, the range of uncontrollability varies widely with the valve setting, that is, it does not occur at the same valve setting each time the system is tested, possibly due to slight changes in temperature and other operating variables.

Another practical problem with slurry flow control in continuous systems is involved with the fact that the circulating slurry picks up foreign matter such as pieces of insulation, pipe scale, etc., which may plug up the flow control device. The device should, therefore, be one that is readily cleaned of such material.

A technique for controlling the solids flow rate in this type of system, which technique involves removal of sufficient liquid from the slurry stream to insure that the solids will substantially all be touching each other before being acted on by the flow control device, is the subject of U.S. Patent 2,834,720. The present invention includes a method which is an improvement over the method of the invention of the aforesaid patent and an apparatus capable of operation according to its teaching or operating outside its teachings as desired or required.

A major object of this invention is to provide a method and apparatus for controlling the rate of flow of granular solids that are mixed with liquids which overcomes the above-described difficulties.

Another object is to provide a method and apparatus for the controlled withdrawal of granular solids from liquid-granular solids contacting chambers by retardation of the flow of solid particles.

Another object is to provide an efficient continuous process for the purification of liquids with adsorbents by providing means for the control of the rate of flow of the granular adsorbent being withdrawn from the contacting chamber.

A further object of this invention is to provide a method and apparatus for controlled removal of granular solids from a contacting zone in which liquid hydrocarbons are being contacted with granular solids.

A still further object of this invention is to provide a method and apparatus for controlling the rate of flow of the granular solids upon withdrawal from a zone in which the solids have contacted aqueous sugar solutions.

These and other objects will be apparent from the following discussion of the invention.

Before proceeding with this discussion, certain terms used in describing and claiming this invention will be defined. The terms "viscous condition" and "plastic condition," and other like terms are used herein to refer to a liquid-granular solids slurry stream having a liquid-granular solids composition such that adjacent granular solids particles substantially all touch each other. The term "turbulent condition" and similar terms are used herein to refer to a slurry stream having a liquid-granular solids composition such that substantially all of the granular solids particles are separated from each other. The term "transient condition" is used herein to refer to a stream having a composition intermediate between viscous condition and turbulent condition, as previously explained in connection with FIGURE 1. The term "liquid type flow" and similar terms are used herein to refer to a slurry stream having a liquid-solids composition such that the stream will flow in about the same manner as a liquid and, thus, will flow around corners and along a horizontal conduit under the influence of only a slight pressure head. A given slurry stream may be in liquid type flow and at the same time in any one of the viscous, turbulent or transient conditions. The liquid type flow condition is to be distinguished from a stream which exists as a "wet mass of granular solids." This term is used to refer to a stream having a liquid-granular solids composition such that the stream has the characteristics of granular solids flow, and thus will not flow downwardly through any passage which is not inclined with the horizontal by an amount at least equal to the angle of repose of the granular solids unless substantial pressure is exerted on the stream. The angle of repose of the granular solids is the angle which a conical pile of the dry solids, formed by issuance from a conduit, would make with the horizontal. It generally lies within the the range 25–40 degrees. As an example, 15–30 mesh Tyler fuller's earth adsorbent has an angle of repose of 37 degrees.

Streams existing as wet masses of granular solids will always be in the viscous flow condition. However, it should be emphasized that all streams in the viscous condition may not exist as wet masses of granular solids; some may be in liquid type flow, especially as the stream approaches the transient condition. However, with some slurries it may be that any composition which gives a stream in the viscous condition likewise gives a stream existing as a wet mass of granular solids.

Broadly, the apparatus of this invention includes a chamber which is closed on the bottom and has an exit port in its side. An upright screen is located within the chamber. The screen has an area greater than the area of the port and its screen openings are smaller in size than the granular solids. A passageway connects the chamber with the liquid-solids contacting vessel from which it is desired to control the solids flow. The outlet end of the passageway is more remote from the port than the screen so that the screen may be interposed between the passageway outlet and the port to block solids flow. The solids flow rate is then controlled by raising and lowering the screen to vary the area beneath the screen through which solids may pass.

The method of this invention involves the passage of a liquid-solids slurry from a liquid-solids contacting zone into a circumferentially complete foraminate member with openings of less than the solids. Sufficient liquid is removed from the slurry through the foraminate member to cause the character of the slurry stream to change from liquid type flow to that of a wet mass of granular solids. Flow of the solids through the bottom of the foraminate member is obstructed by means of a horizontal solid surface. A stream of granular solids flows through the area between the lower end of the foraminate member and the solid surface and the solids rate is adjusted by adjusting the distance between said foraminate member and said solid surface. A part of the liquid removed through the foraminate member in changing the character of the slurry stream is returned to the area between said foraminate member and said solid surface to wash solids off of said solid surface.

Turning now to FIGURE 2, there is shown therein the flow plan of a recently developed commercial process for removing small amounts of impurities, such as color bodies, from liquid hydrocarbon oils by percolation of the oils through a moving mass of granular adsorbent. This process is described in detail and claimed in U.S. Patent 2,701,786 to Evans et al. A supply of a suitable granular adsorbent is maintained within hopper 10. Typical adsorbents which may be used in this process include fuller's earth, bauxite, bentonite, charcoal, magnesium silicate, heat and acid activated kaolin and activated carbon. Synthetic silica or alumina or silica-alumina gel adsorbents may also be employed. The purposes for which the liquid oil may be treated include decolorization, neutralization and removal of dissolved or suspended impurities, such as carbon or coke or oxygen and nitrogen containing impurities, and other gum forming compounds.

The fresh adsorbent gravitates from supply hopper 10 through passage 12 into the upper section of treater 11. Adsorbent passes through the treating or contacting zone within treater 11 as a downwardly moving columnar mass. The liquid hydrocarbon charge oil enters the system through passage 13. It is heated to the desired treating temperature by passage through heater 14. The treating temperature may lie within the range 0–700° F. and should generally be below the flash point of the oil. In a typical operation for decolorizing a mineral oil, the treating temperature might be about 300° F. The heated liquid charge passes through passage 15 into the lower section of the contacting zone within treater 11 and then passes upwardly through the downwardly moving columnar mass of adsorbent at a velocity below that which would disrupt the mass to effect the desired treatment. The treated product is removed from the upper section of treater 11 through passage 16. The used adsorbent and some liquid oil pass as a plurality of slurry streams from the lower section of the contacting zone downwardly through passages 17. These slurry streams are combined in a collector 18 into a single slurry stream which passes downwardly through passage 19 into flow control device 20, constructed according to this invention. The flow control device, which effects separation of some of the oil from the adsorbent, is described in detail below. Oil separated from oil-adsorbent slurry in the flow control device 20 passes through line 21 to pump 22, where it is pumped through passage 23 into feed passage 15, to be returned to the contacting zone within treater 11. The granular adsorbent, with some of the oil removed therefrom, passes from the flow control device 20 through a funnel-like collector 24 downwardly into the upper end of washer 25. The adsorbent, which is still wet with oil from the treater, passes downwardly through a washing or contacting zone 26 as a columnar mass. A washing solvent is pumped from tank 27 by means of pump 28 through line 29 into the lower end of the washing zone within washer 25. Typical solvents suitable for the washing step include carbon tetrachloride, normal heptane, normal octane, petroleum naphtha boiling within the range 100–400° F. and carbon disulfide. A preferred solvent is a paraffinic naphtha boiling within the range about 210–300° F. The washing may be conducted below, at, or above atmospheric pressure and at any temperature below the temperature at which substantial vaporization of the solvent occurs; typically, a temperature within the range 60–250° F. might be used.

Solvent passes upwardly through the downwardly moving adsorbent to remove liquid oil therefrom. Conditions within the washing zone should be controlled so that substantial amounts of adsorbed impurities are not also removed from the adsorbent. The solvent-liquid oil mixture passes from the upper end of the washer through passage 30 into a fractionator 31. In the fractionator, solvent and liquid oil are separated, the solvent passing overhead through line 32 as a vapor and being condensed by means of condenser 33 and returned to tank 27 through passage 34. The liquid oil is taken as bottoms and recharged to the treater by means of passages 35 and 15. The washed adsorbent is removed from the lower end of the washing zone through passage 36 at a rate controlled by flow control device 20', similar to device 20, designed according to this invention. Solvent is removed from the flow control device through passage 21' and passed into tank 27. Adsorbent passes into collecting funnel 24' and then downwardly into a drier 37.

The details of one suitable type of drier are described and claimed in U.S. Patent 2,724,190 to Bergstrom. In this type of drier, adsorbent is maintained as a boiling bed by means of a condensible stripping gas which enters the drier through passage 38. Heat is supplied to the boiling bed by indirect heat exchange with a suitable heating fluid admitted to tubes within the drier by means of inlet 39 and removed from the tubes through outlet 40. Stripping gas and solvent which has been vaporized pass from the upper end of the drier through passage 41 into a quencher 42, where stripping gas and solvent are condensed by means of cold water admitted through passage 43. The liquid materials are then passed into tank 27 by means of passage 44. The water and condensed stripping gas are removed from the lower end of the tank through passage 45. The dried adsorbent is removed from the drier through passage 46 and passed to the lower section of a conveyor 47. Conveyor 47 may be of any design suitable for transferring the granular material, for example, it may be a bucket elevator or gas lift. The adsorbent passes upwardly through the conveyor and is discharged into passage 48, from which it passes into kiln 49. Within the kiln the adsorbent is contacted with a suitable combustion supporting gas, such as air, which is admitted through passage 50. The combustion supporting gas is utilized to burn off the impurities on the adsorbent and flue gas is removed through passage 51. Suitable cooling coils are provided within the kiln to control the temperature therein below the level at which the adsorbent would be permanently damaged. The revivified adsorbent is removed from the lower section of the kiln through passage 52 and is cooled by means of cooler 53 to the desired temperature for use in treater 11. Adsorbent is then elevated to a level above supply hopper 10 by means of conveyor 54 and passed into the hopper 10 through passage 55.

In FIGURE 3 is shown a preferred embodiment of the flow control device in which 56 designates the flow control compartment for effecting a throttling of the slurry. The compartment is cylindrical in structure, having an enlarged top section 57, a tapered skirt section 58 extending downwardly and terminating in a small cylindrical section 59 closed at the bottom to form a retaining wall. Located in the tapered section 58 is an exit line 21 for carrying oil to pump 22 for return to treater 11 (see FIGURE 2). In the periphery of cylindrical section 59 is a port 60 located adjacent to the bottom for draining oil and adsorbent particles therefrom. Leading from the port or opening 60 is a chute or line 24 for conveying the wet mass of adsorbent particles to the washer 25. The cylindrical portion 59 extends upwardly above the bottom portion of tapered section 58 so as to provide a spill-over annulus arrangement or trough 61 for oil exiting through line 21. On the bottom of the cylindrical section 59 is a boss 62 defining a threaded opening adapted to receive an adjusting bolt 63. Within the lower cylindrical portion 59 is a cylindrical screen 64 extending from the bottom of the cylindrical section 59 to a distance in the enlarged top section 57 and so arranged to provide a draining annulus between the outer periphery of the screen and the inner periphery of the cylindrical section 59. Screen 64 is open on top and bottom.

On the bottom of the screen 64 is a spider arrangement 65, against which adjusting bolt 63 rests so that the screen can be raised or lowered with respect to cylindrical portion 59. In this manner the opening represented by port 60 can be varied with the port completely opened when the adjusting bolt is completely threaded in and partially closed for various other positions of the bolt. The spider arrangement 65 is so constructed as to offer the minimum amount of resistance to the flow of wet mass of adsorbent solids gravitating downward in the flow control chamber through the screen. Entering the top cylindrical section 57 is a conduit 19 for carrying the oil-adsorbent slurry from the treater to the flow compartment. The exit end of conduit 19 is positioned within screen 64. The cross-sectional area of conduit 19 is smaller than the cross-sectional area of screen 64.

In operation, a stream of liquid-granular solids slurry gravitates from the bottom of the liquid-granular solids contact chamber through passage or conduit 19 and exits in flow control chamber 56. The slurry may be in either the turbulent, transient or viscous flow condition. The conduit 19 is located within the retarding screen 64, allowing the slurry to spread out due to the increase in cross-sectional area of the screen over the conduit. Immediately upon entering the screen the liquid or oil passes therethrough into the annulus between the screen and the lower section of the cylindrical chamber 59. Excess oil from the slurry entering the annulus space spills over annulus 61, passing out through the draw-off line 21 where it is pumped to treater 11 to enter with the feed. The loss of oil from the slurry insures that the flow characteristic of the slurry within the screen will be that of a wet mass of granular solids. The wet mass of solids flows within the confines of the screen to the bottom of the cylindrical portion 59 where the solids exit through port 60. By adjusting the position of the screen within the lower cylindrical chamber 59, the opening in port 60 can be varied so as to place the necessary hindrance to the flow of solids to provide the desired retardation so that the granular solids will be removed at the desired rate from the contact zone through conduit 19. This retardation of the movement of the granular solids is reflected back to the treating zone where control of the rate at which the granular solids move therethrough is effected.

The rate of granular solids removal in a device of this invention is controlled by a combination of factors. The maximum capacity of any given unit is, of course, limited by the size and length of the conduit leading from the contacting zone into the flow control chamber. When this is fixed, the rate of control is effected by controlling the area of the port, which is uncovered, which in turn may be adjusted by adjusting the position of the lower end of the screen with respect to the port.

Another form of the device of this invention is illustrtaed in FIGURE 6. It will be noted that the device of FIGURE 6 differs from that of FIGURES 3–5 in two material respects, (a) the liquid-solids slurry from the contacting vessel is delivered upwardly through conduit 19 into the bottom of chamber 59 and (b) no provision for liquid overflowing the chamber 59 is included so that all liquid must flow out port 60 and passageway 24 with the solids.

Control of the solids flow with the device of FIGURE 6 is effected in the same manner as with the device of FIGURES 3–5, by raising and lowering screen 64 with adjusting screw 63.

When the device is acting to control solids flow, i.e., retaining solids flow, liquid will drain through screen 64 and down chute 24. This will reduce the liquid content of the slurry inside screen 64 and may convert the slurry into viscous flow. On the other hand, the conversion in flow type need not occur for the device to operate. In any case, the device of FIGURE 6 has been found in actual practice to control solids flow over a wide range of flow rates without the range of uncontrollability encountered with conventional control valves.

FIGURE 7 illustrates the use of a device like that shown in FIGURE 6 with a liquid-solids contacting vessel. The contacting vessel 71 is equipped with a solids outlet 72 in which the slurry reverses direction so that it enters the lower end of chamber 59. In this system the conduit 72 is so sized that the liquid from vessel 71 enters conduit 72 at a velocity sufficient to lift the solids into flow control device 59.

It will be obvious that in the arrangement of FIGURE 7 the solids are forced into and through conduit 72 and the flow device 59 by the difference in liquid head between the liquid level in the treating vessel 71 and the level of the outlet conduit 24 from chamber 59. Clearly this head differential must be at least sufficient to force solids at the desired rate through conduit 72 when screen 64 is not obstructing the flow at all. In actual practice the flow rate without the screen obstruction should be above the desired rate so that needed flexibility in adjusting the rate will be available.

FIGURE 8 illustrates still another alternative within the scope of this invention which is particularly suitable for controlling solids flow at very low rates. If screen 64 must be set very close to the bottom of chamber 59 in order to obtain the desired flow rate, accurate control is often difficult because of the bridging of solids particles between the lower end of screen 64 and the bottom of chamber 59. For this reason it is usually undesirable to attempt to operate with screen 64 closer than twice the average diameter of the granular solids particles and preferably the distance between the two should be at least four times the average diameter of the particles.

The device of FIGURE 8 takes care of flow control at the very low rates by providing, in addition to a construction of the type illustrated in FIGURES 3–7, a screen 73 covering the outside of port 60. This screen will have openings of smaller size than the granular solids particles. Screen 73 is equipped with a suitable mechanism for raising and lowering the screen, for example, a rack 74 and pinion 75 operated by a motor 76. Motor 76 may be operated by a cycle timer 77.

In the operation of the device of FIGURE 8, screen 64 is raised to a level at which the particles will not bridge to give a solids flow rate above the desired flow rate when screen 73 is not obstructing solids flow. Motor 76 is then used to raise and lower screen 73 periodically to give the desired average solids flow rate. The frequency with which screen 73 is raised and lowered can be set by cycle timer 77.

Obviously, with the device of FIGURE 8, there should not be too substantial a time lapse between successive openings and closings of screen 73. For this reason cycle timer 77 should be adjusted to operate screen 73 on relatively short cycles. In practice a cycle time (one opening and closing) of as much as one minute has been used successfully.

It is to be noted that in the various species of the invention illustrated, screen 64 has been shown as circumferentially complete and conforming to the shape of chamber 59. Within the broad scope of this invention, screen 64 may merely be a screen of larger size than port 60 which extends across chamber 59 between the point of liquid-solids slurry supply, e.g., the outlet of conduit 19 and port 60, so that the screen may prevent or restrict solids flow from the point of supply to the port.

The circumferentially complete screen which fits closely with chamber 59 is preferred because it may easily be moved vertically without substantial lateral movement and the operative part of the screen will not, therefore, be dislodged from its position between port and point of slurry supply as a screen of another shape might.

When the device is to be operated so that liquid overflows chamber 59, screen 64 should have a greater height than chamber 59 so that solids will not escape through liquid outlet 21. In addition, screen 64 should preferably be closed on top to prevent overflow of solids but within the broad scope of this invention it need not be so closed. It is preferred, when a circumferentially complete screen is used, that the clearance between screen 64 and cylinder 59 be within the range $\frac{1}{16}$ to $\frac{1}{4}$ inch at all points.

While one of the species of FIGURE 6 is shown herein as operating without liquid overflowing chamber 59, it will be obvious that any of the other species may be so operated if desired. Likewise, any of the other species may use an upwardly directed conduit 19.

As pointed out above, this apparatus may be used to effect a transformation of the flow character of the slurry stream into that of a wet mass of granular solids from another flow condition. The apparatus of this invention may be used effectively, however, whether or not such a transformation occurs.

The term "screen" is used herein, with reference to members 64 and 73, to refer to any type of perforated member which will retain the granular solids but pass the liquid through. A preferred material for construction of this member is stainless steel woven wire screening having square or rectangular openings. The screen mesh size to be used will, of course, depend on the size of the granular solids. Table I gives preferred screen sizes in Tyler mesh and inches for granular solids of varying sizes.

TABLE I

| Granular Solids Size | | Screen Opening | |
|---|---|---|---|
| Mesh | Average Particle Diameter, Inches | Mesh | Inches |
| 4–8 | 0.139 | 12 | 0.055 |
| 8–15 | 0.063 | 30 | 0.0214 |
| 15–30 | 0.032 | 60 | 0.0097 |
| 30–60 | 0.0155 | 100 | 0.0049 |
| 60–80 | 0.0079 | 150 | 0.0041 |
| 80–100 | 0.0054 | 200 | 0.0029 |
| 100 | | Porous Media | |

The perforated surface, particularly when it is of fine mesh, should be supported by an open grill work of maximum rigidity and maximum open area, so that proper drainage of the liquid will be effected while still preventing excessive distortion of the perforated surface. As an example, a grating with 1-inch square openings has been found to be a suitable support for a 100 mesh screen. While many of the various parts of the apparatus of this invention have been shown as circular in cross-sectional shape, they may, within the broad scope of this invention, be any other desired shape.

Example I

A device was designed according to this invention for use with a slurry of 30–60 mesh Attapulgus clay and liquid mineral oil of 5 centipoises viscosity. This design was along the lines illustrated in FIGURES 3–5. The conduit or drain passage 19 consisted of a ¾-inch diameter vertical pipe leading from the bottom of the treater into a cylindrical flow control compartment 59 two inches in diameter with a 0.5 inch by one inch port or opening for removal of the wet clay after liquid removal. A 100 mesh vertically movable screen 64 was positioned within compartment 59.

The size of the opening for solids flow was varied by positioning the screen with respect to the port. Under these conditions granular adsorbent flow rates were observed to be accurately controlled over a range of 0, for a closed opening, to 1200 cc./min. when the port was wide open.

Example II

Using a slurry of the consistency of Example I in a device like that of FIGURES 3–5 having a conduit of 4 inches in diameter discharging into an 8 inch diameter screen positioned within a cylinder 59 with 3 square inches for discharging solids, flow rates were observed to be controllable over a range of from 0 to 2 g.p.m., depending on the position of the screen in respect to the port.

It was also noticed that by using multiple ports with the proper ratio of conduit diameter to screen diameter, slurry flows were maintainable over any desirable flow rate within the treater.

Example III

In a device like that of FIGURE 6 for controlling the flow of bone char of 12–40 mesh Tyler, which is being withdrawn from a contactor in which sugar liquor of 7 centipoises viscosity is being treated, cylinder 59 was 2.5 inches in diameter. Screen 64 and openings of 80 mesh Tyler. Conduit 19 entered the bottom of chamber 59 and was 0.75 inch in diameter. This device was capable of effective solids flow control within the range 0 to 2000 cubic centimeters per minute.

Example IV

In a device designed in the manner illustrated in FIGURE 8, designed to handle bone char in admixture with sugar solution having a viscosity of 7 centipoises, chamber 59 was a cylinder of 2.5 inches in diameter. Screens 64 and 73 were of 80 mesh. This device was capable of flow control over the range 0 to 2000 cubic centimeters per minute. As a more particular example, to achieve a solids flow rate of about 400 cubic centimeters per minute with the above-mentioned solids, screen 64 might be set 0.5 inch above the bottom of chamber 59, and screen 73, operated by a cycle timer, would be open thirty seconds and closed thirty seconds in each cycle.

It should be understood that this invention is intended to include all changes and modifications of the examples of the invention herein chosen for purposes of disclosure which do not constitute departures from the spirit and scope of the invention.

I claim:

1. An apparatus for controlling the rate of withdrawal of granular solids from a chamber in which liquid and granular solids are contacted, which comprises in combination: an upright hollow cylinder; a member closing the bottom of said cylinder; an upright cylindrical screen of greater height than said cylinder with lower end within said cylinder, said screen being capable of vertical movement and the openings in said screen being of less size than the granular solids; a solids exit port in the wall of said cylinder; a conduit extending from said chamber and terminating in a downwardly facing outlet within said screen above said solids exit port; means for adjusting the height of said screen relative to said cylinder to uncover varying areas of said port so as to control the solids flow rate through said port and thereby the solids flow rate from said chamber and means for removing as overflow from said cylinder liquid from the space between said screen and said cylinder.

2. A method for the controlled withdrawal of granular solids from a liquid-granular solids contacting zone, which comprises: flowing liquid-granular solids slurry in liquid type flow from said contacting zone and discharging said slurry into a circumferentially complete foraminate member open on its bottom but having sides which are pervious to liquid but impervious to the granular solids; withdrawing from said slurry through the sides of said foraminate member sufficient liquid to cause the character of the slurry to change from liquid type flow to that of a wet mass of granular solids; obstructing the flow of solids through the bottom of said foraminate member by means of a horizontal solid surface maintained below said member; flowing a stream of granular solids from the area between the lower end of said foraminate member and said horizontal surface, said stream originating below the level of discharge of said slurry into said foraminate member; adjusting the flow rate of said solids from said contacting zone by adjusting the height of the lower end of said foraminate member above said horizontal surface, thereby varying the degree of said obstruction and the quantity of solids entering said stream; flowing a part of the liquid previously removed from said slurry into said solids located between the lower end of said foraminate member and said horizontal surface to wash solids off of said horizontal surface and into said stream.

3. An apparatus for controlling the rate of withdrawal of granular solids from a liquid-granular solids contacting vessel, which comprises in combination: an upright chamber open on top and closed on the bottom; a port in the side of said chamber; a circumferentially complete upright screen, having screen openings of less size than the granular solids, open on its bottom situated within said chamber and capable of being moved vertically therein, the upper end of said screen extending to a level above the upper end of said chamber when said screen is touching the bottom of said chamber; members defining a passageway from said vessel adapted to deliver solids from the vessel to the interior of said screen, the discharge end of said passageway being situated above said port and means for carrying away liquid which overflows said chamber.

4. An apparatus for controlling the rate of withdrawal of granular solids from a liquid-solids contacting vessel, which comprises in combination: an upright chamber closed on the bottom; a port in the side of said chamber; an upright screen situated within said chamber of total area greater than said port and having screen openings of less size than said granular solids and capable of upward and downward movement in front of said port to uncover varying areas of said port; members defining a passageway for the supply of liquid-granular solids mixture from said vessel to said chamber, the outlet end of said passageway being more remote from said port than at least a substantial part of said screen, whereby said screen may be interposed between said outlet end and said port and said solids withdrawal rate may be controlled by raising and lowering said screen to uncover varying areas of said port.

5. An apparatus for controlling the rate of withdrawal of granular solids from a chamber in which liquid and granular solids are contacted, which comprises in combination: an upright hollow cylinder; a member closing the bottom of said cylinder; an upright cylindrical screen having openings of less size than the granular solids situated within said cylinder and capable of vertical movement within said cylinder; a solids exit port in the wall of said cylinder; members defining a passageway extending from said chamber into and through the member closing the bottom of said cylinder and terminating on an upwardly facing outlet within the area enclosed laterally by the projection of said screen, whereby granular solids flow may be controlled by raising and lowering said screen to uncover varying areas of said exit port.

6. An apparatus for controlling the rate of withdrawal of granular solids from a vessel in which liquid and solids are contacted, which comprises in combination: an upright chamber open on top and closed on the bottom; a solids exit port in the side of said chamber; a first upright screen of greater area than said port, having screen openings of less size than the granular solids, situated within said chamber and capable of vertical movement; members defining a passageway for the flow of solids mixed with liquid from said vessel to said chamber, said passageway terminating within said chamber on an outlet end which is more remote from said port than at least a substantial part of the first screen so that said first screen may be interposed between said port and said outlet end; a second upright screen with openings of less size than the granular solids situated outside of said chamber in front of said port and capable of completely covering said port and means for periodically raising said second screen to uncover said port, whereby the flow of the granular solids may be controlled by adjusting the height of said first screen to provide a flow rate above the desired flow rate when said second screen is not covering said port and adjusting the frequency with which said second screen is raised and lowered to adjust the solids flow rate to the desired rate.

7. The apparatus of claim 6 further limited to said chamber being cylindrical in shape and said first screen being a hollow cylinder and said liquid-solids mixture being fed into the area enclosed laterally by the first screen and its projection.

References Cited in the file of this patent

UNITED STATES PATENTS

| | | |
|---|---|---|
| 2,794,772 | Savoca et al. | June 4, 1957 |
| 2,850,438 | Bodkin et al. | Sept. 2, 1958 |

FOREIGN PATENTS

| | | |
|---|---|---|
| 546,647 | Belgium | Apr. 14, 1956 |